June 4, 1968  L. CASAGRANDE ET AL  3,386,251
METHOD OF STRENGTHENING AND STABILIZING COMPRESSIBLE SOILS
Filed May 23, 1966  5 Sheets-Sheet 5

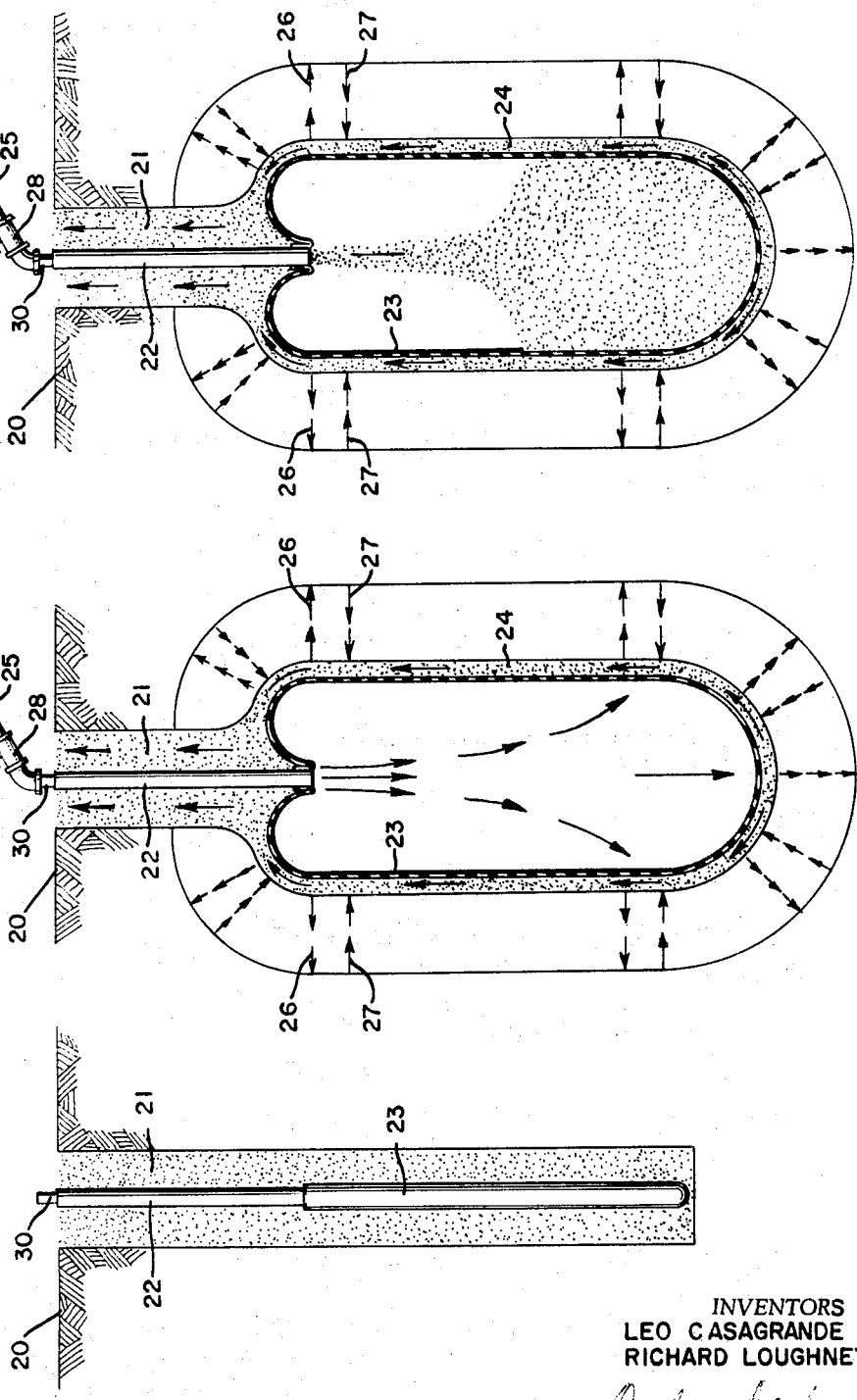

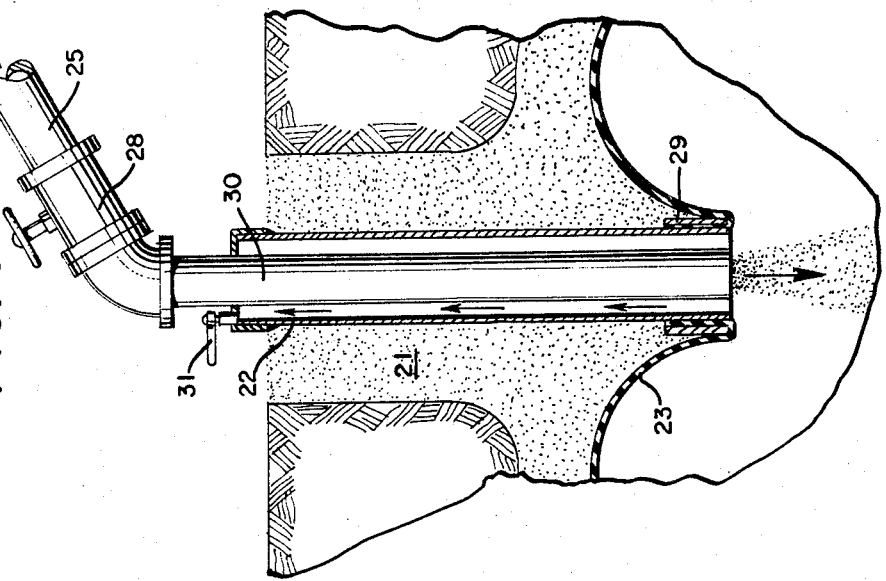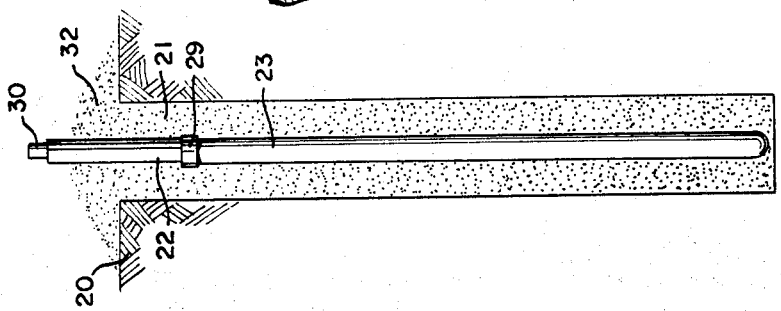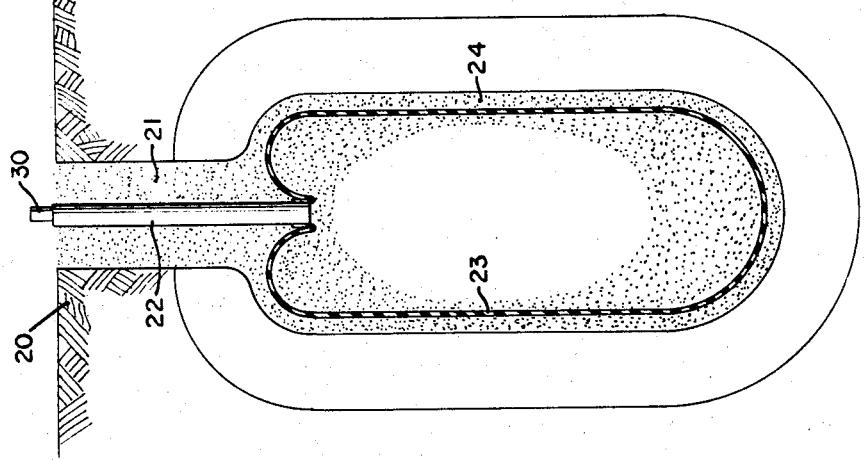

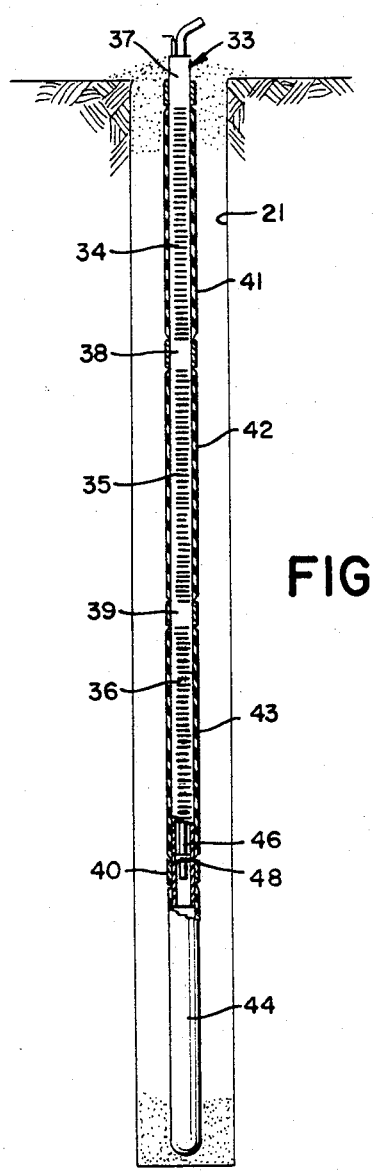
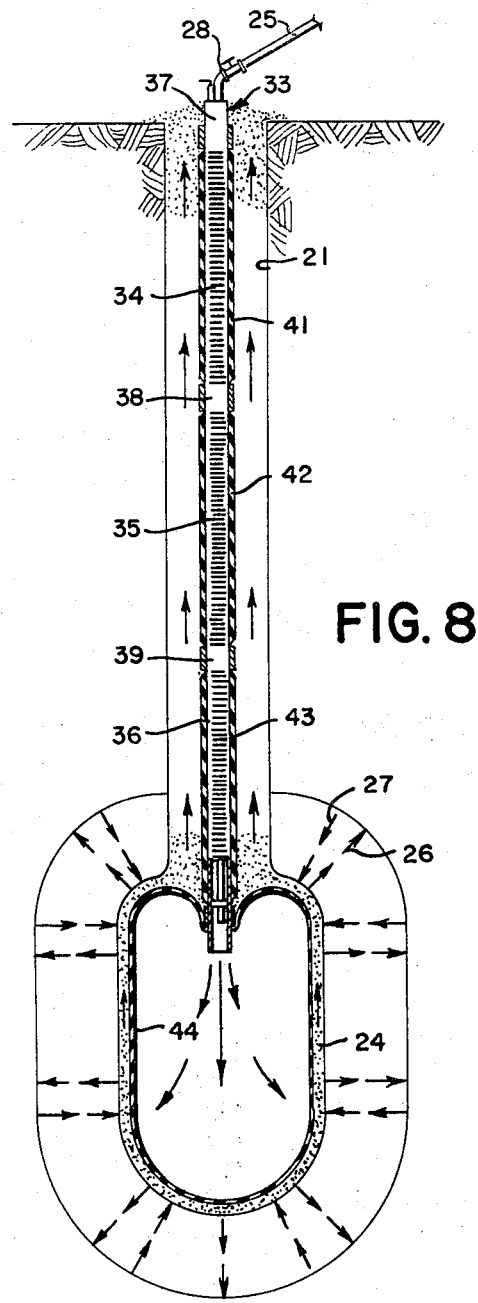

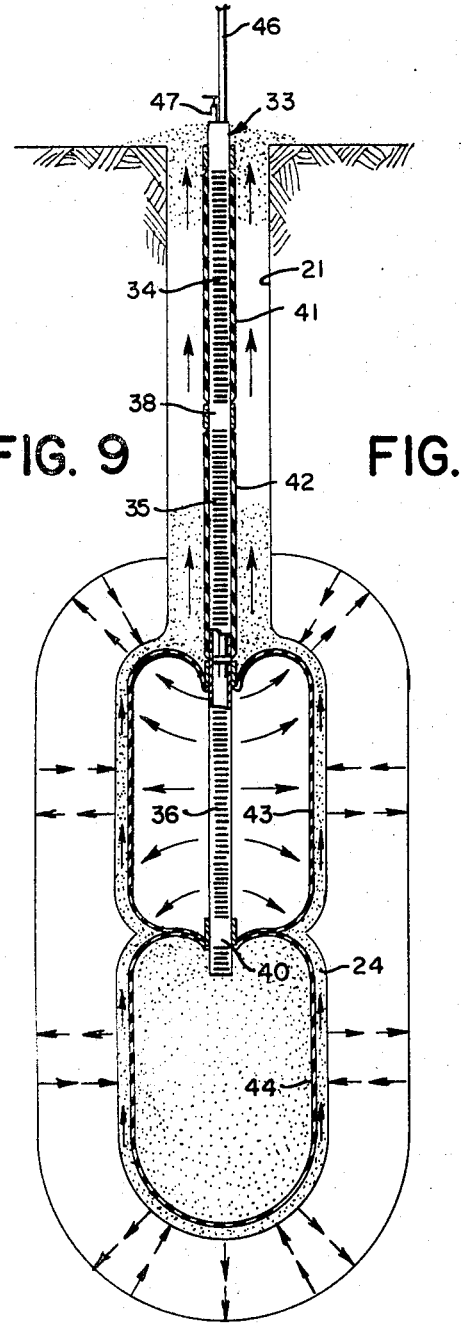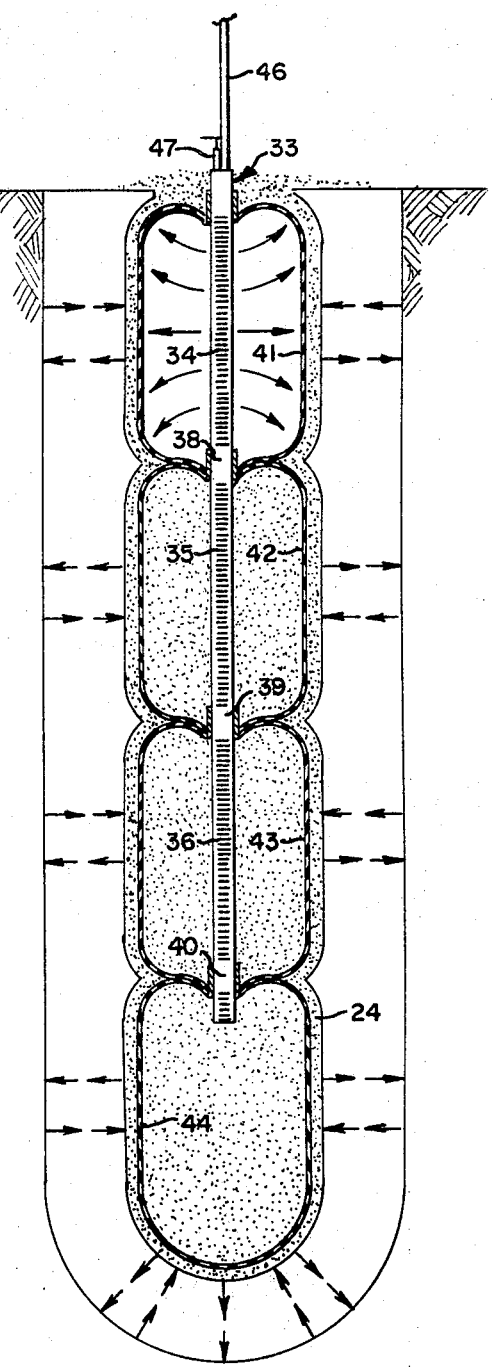

INVENTORS
LEO CASAGRANDE
RICHARD LOUGHNEY
BY
ATTORNEYS

United States Patent Office 3,386,251
Patented June 4, 1968

3,386,251
METHOD OF STRENGTHENING AND STABILIZING COMPRESSIBLE SOILS
Leo Casagrande, Winchester, Mass., and Richard W. Loughney, Oceanside, N.Y., assignors to Griffin Wellpoint Corporation, New York, N.Y., a corporation of New York
Filed May 23, 1966, Ser. No. 552,298
14 Claims. (Cl. 61—35)

ABSTRACT OF THE DISCLOSURE

The disclosure herein sets forth a method and means for stabilizing soil, consisting essentially of spacing holes about an area the soil of which is to be strengthened and stabilized; inserting in each hole an expandable member such as a stretchable membrane of lesser diameter than the daimeter of the hole; filling the annular space between the unexpanded membrane and the hole wall with drainage material such as sand; and simultaneously expanding the membranes in all holes to expand the holes and force pore water out of the soil into the drains. The method contemplates increasing the pressure in the holes as the soil is strengthened, to assure that the pressure originally applied does not cause collapse of the soil, and also contemplates maintaining a particular pressure for sufficient time to effect the desired degree of strengthening. In some instances a plurality of membranes is provided in each hole, those at the further depth being simultaneously gradually pressurized, followed by those at increasingly lesser depths in order to assure that the maximum pressure applied will be sufficient to strengthen the soil at the greater depths, while at the same time a lesser maximum pressure can be applied at the lesser depths, thus assuring that soil strengthening will occur and soil collapsed will not.

---

The present invention relates to a method of and apparatus for strengthening and stabilizing soils and particularly to such a method which is performed without the necessity of loading or surcharging the soil as by utilizing earth or slag fill or the like.

It is often desirable to locate a structure such as a building, road, airport, or dam where the soil is of such low strength that it is impossible without treatment to build thereon. In the past the most common method of strengthening such soils has been to place a load, such as earth fill, slag or other material on the surface of the ground, the amount of such fill ranging ordinarily from 10 to 60 feet in height. When this method of strengthening and stabilizing soil is utilized it is essential that the fill be added at a rate which does not cause soil failure and likewise essential that the fill remain for a sufficient period of time to strengthen the soil sufficiently to support the structure.

Moreover, when the soil has been strengthened to the desired degree the fill has to be removed or at least partially removed, the result being that the procedure is time-consuming and expensive.

It is known to somewhat reduce the time required for soil strengthening and stabilizing when using surcharge by utilizing sand drains, thus permitting the water to be removed from the soil at a more rapid rate. However, even when this is done many months are necessary to properly consolidate the soil, this period ranging from approximately 3 to 12 months or even more.

By the method of the present invention many of the disadvantages of the surcharge or fill method of strengthening and stabilizing soils are eliminated or materially decreased. Some of the disadvantages of the surcharge method have been indicated above. Additionally the surcharge method necessarily results in having the surcharge load substantially equally effective on all the underlying layers of soil despite the fact that those layers do not have the same initial strength and do not therefore require the same pressure to bring that strength up to the desired value.

Moreover, unless the surface load or surcharge is applied with great care soil failure results and when sand drains are used these drains may be sheared and thus fail to perform their drainage function. In order to avoid soil failure the load must be applied gradually and this of course increases the time necessary to produce the required strengthening and stabilization.

Additionally, in the surcharge method it is necessary to install a multitude of piezometers in the soil at various levels on order to determine the pore pressures and thus guide the placing of the surcharge to keep the pressures at a sufficiently low level to assure that soil failure will not occur, whereas by utilizing our method the number of piezometers may be materially reduced since the danger of soil failure is minimized.

The present method of soil strengthening and stabilizing consists essentially of applying pressure to the soil at various depths without the necessity of surcharging the soil, thus eliminating or materially reducing the expense of placing the fill or surcharge of the soil and after stabilization removing that surcharge and at the same time minimizing the time required to stabilize the soil.

Additionally, by our method the usual sand drains do not add to the overall expense of the operation since such drains or the equivalent thereof form part of the apparatus and method of this invention.

Brefly, the method of the present invention consists in providing a plurality of holes over the area to be stabilized, these holes being formed in any of the usual manners such as by jetting, driving, drilling or augering. As a typical example the holes may be of from 4 to 20 inches in diameter, may extend to a depth of 150 feet, may be spaced apart 10 to 50 feet on centers and may be installed vertically downward, vertically nupward, horizontally or at any desired angle. After the holes are drilled, each hole has placed therein a pipe which may be, for example, of approximately 2 to 4 inches in interior diameter or the equivalent rectangular tube, each pipe being provided with an expandable member capable of being expanded to a diameter of several feet. After the pipe with the expandable member fixed thereto is placed in the hole, sand is placed around it, filling the space between the exterior walls of the expandable member and the walls of the hole, thus forming a sand drain. Thereafter the expandable member is put under pressure and expanded against the walls of the hole, placing pressure upon the soil and causing the water to be drained therefrom into the sand drains through which it rises to the surface and may be disposed of, it being understood that ordinarily the pressure is maintained and gradually increased over a considerable period of time, the holes being enlarged during this period.

As has been indicated, by this method the time and expense required to stabilize the soil is materially reduced. For example, the required strenghtening, using the surcharge method, might require 9 months to accomplish whereas by the method of the present invention the same strengthening can be accomplished in a fraction of that time. The likelihhod of failure of the soil is minimized and, in fact, in many instances completely eliminated since no surcharge load need be applied.

It is an object of the invention to provide a method and apparatus for strengthening and stabilizing soil which applies pressure to the soil at varying depths thereof and which does not require the use of earth fill, slag fill or the like and therefore eliminates the expense involved in placing and removing such fill.

It is another object of the invention to materially reduce the time required to strengthen and stabilize soil.

It is still another object of the invention to provide a means of strengthening and stabilizing soil which makes it possible to apply desired pressures at different soil levels.

It is another object of the invention to provide a method of strengthening and stabilizing soil which incorporates the use of sand drains and which provides for completely filling the holes with sand or concrete after the soil has been stabilized or in some instances during the stabilization process.

It is still another object of the invention to provide a method for soil strengthening which is readily performed using simple apparatus, thus materially reducing the expense of soil stabilizing operations.

It is a still further object of the invention to provide a method of soil strengthening which makes it possible to stabilize a small or inaccessible area and to do so with the holes installed vertically upward, vertically downward, horizontally, or at any desired angle.

Other objects and features of the invention will be apparent when the following description is considered in connection with the annexed drawings, in which, FIGURE 1 is a vertical cross-sectional view showing a hole in soil to be stabilized with a pipe and an expandable member according to our invention installed therein and sand filled around the unit;

FIGURE 2 illustrates the condition when the expandable member has had fluid pressure applied thereto, thus exerting a pressure against the walls and enlarging the hole;

FIGURE 3 illustrates the condition when the expandable member has been partially filled with sand to thereby maintain the expandable member in its expanded condition and permit the release of the fluid pressure;

FIGURE 4 illustrates the conditions after the expandable member has been completely filled with sand and the filling pipe removed;

FIGURE 5 is a view similar to FIGURE 1, but showing a slightly different condition in that the expandable member extends closer to the surface and thus requires a small amount of surcharge about the pipe in order to prevent blowout when the expandable member is expanded;

FIGURE 6 is a fragmentary vertical cross-sectional view showing means whereby the expanded expandable member may be filled with sand or concrete after the soil has been strengthened and stabilized to the desired extent;

FIGURE 7 is again similar to FIGURE 1 but illustrates a mode of sectionalizing the expandable member so that pressure may be applied first to the lower layers of soil and thereafter to succeeding upper layers, the pressure being varied from a maximum at the lower layers to a minimum in the upper layers;

FIGURE 8 illustrates the arrangement of FIGURE 7 after the lowermost expandable member has been pressurized;

FIGURE 9 is similar to FIGURE 8 but illustrating the condition after the lowermost expandable member has been filled with sand and the next higher member has been pressurized;

FIGURE 10 illustrates the condition after three of the expandable members have been pressurized and filled with sand and the fourth member has been pressurized;

Figure 11:
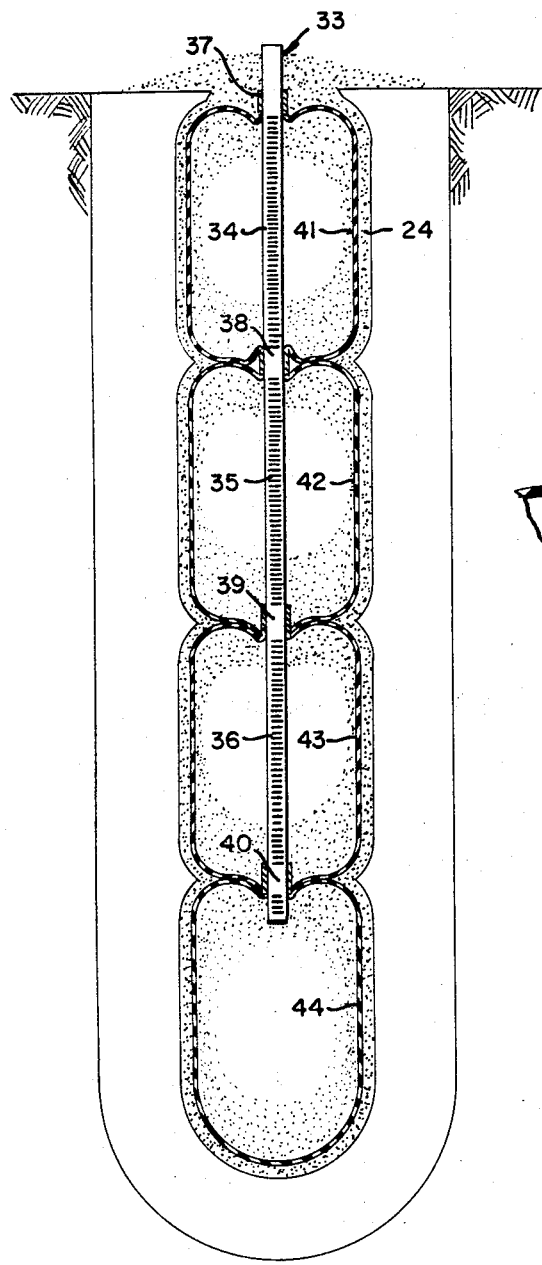
Figure 12:
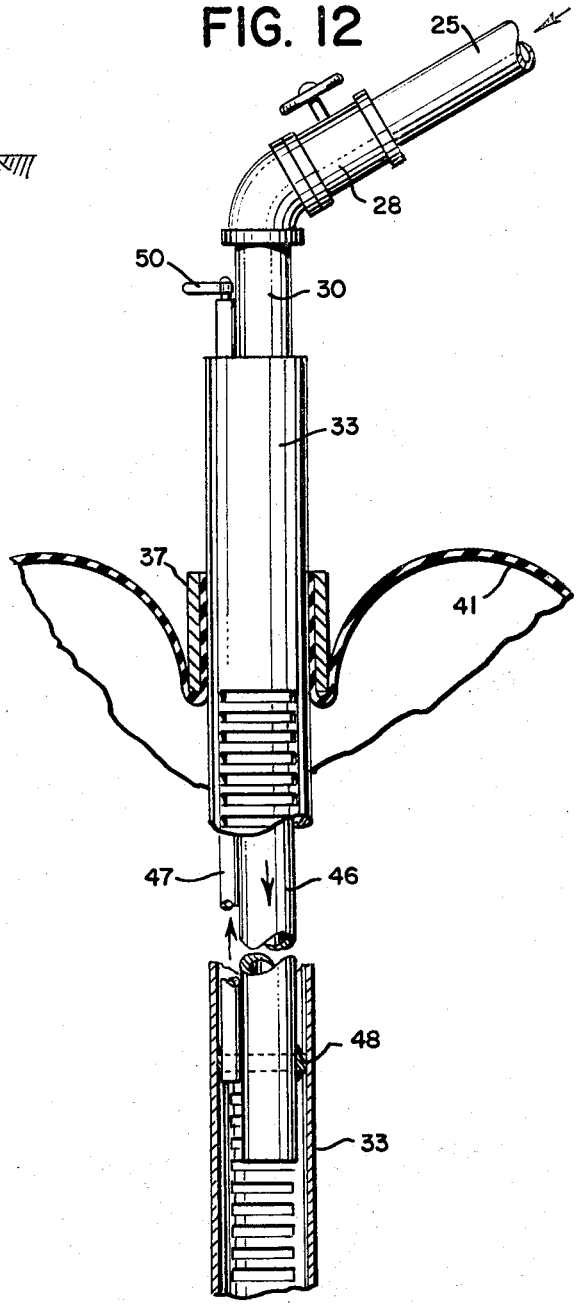

FIGURE 11 is similar to FIGURES 8, 9 and 10 and illustrates the condition when all of the expandable members have been filled with sand; and FIGURE 12 is a fragmentary cross-sectional view showing the arrangement of the fluid pressure pipe within a perforated pipe in such manner as to provide for applying pressure to the expandable members sequentially. This view also ilustrates the mode of filling the expandable members with sand.

Referring now to the drawings and particularly to FIGURE 1, there is shown therein a cross-section of soil 20 in which there has been formed, by drilling or like operation, a hole 21. A pipe 22, with an expandable member such as a stretchable membrane 23 fixed thereto at its lower end, has been inserted into the hole 21 with the bottom of membrane 23 closely adjacent the bottom of the hole 21. Sand 24 has been filled in around the pipe and membrane and the preparation for applying pressure completed.

It should be noted at this time that the stretchable membrane 23 may be made of rubber, plastic or the like or may be replaced by another type of expandable member, for example, a fluid impervious member having longitudinal pleats may be utilized so that when pressure is applied it will expand against the walls. It should also be noted that under some conditions it will be necessary to apply a casing of substantially the size of the drilled hole as the hole is made in order to prevent collapse of the walls, the casing then being removed after the sand filling has been installed.

After the area to be stabilized has been provided with holes 20 throughout its area or a set area, the holes being spaced as indicated hereinabove at from 10 to 50 feet on centers and the pipes and membranes installed, the pipes 30 within pipes 22 are connected by means of pipes 25, see FIGURE 2, to a pressure source and the expandable members or membranes 23 caused to expand against and enlarge the walls of the hole 21 as is shown in FIGURE 2, it being understood that the time period for such expansion is variable, depending on the soil condition. As indicated by the arrows 26 pressure is exerted against the soil in substantially a horizontal direction and additionally in other directions at the top and bottom.

Although the holes such as 21 would normally be vertical this is not essential and they may extend at any desired angle. As indicated by the arrows 27, water which is forced out of the soil by virtue of the pressure exerted upon the soil by cooperation of the various expandable members 23 enters the sand 24 and flows upwardly and onto the soil surface where it may flow away by gravity or may be pumped away.

As has been indicated hereinabove, after the expandable members have been expanded by the exertion of fluid pressure thereon (which may be either air pressure, gas pressure or hydraulic pressure) and the exerted pressure has consolidated and strengthened the soil, the expanded member is filled with sand to maintain it in its expanded condition. FIGURE 3 illustrates the expandable member 23 partially filled with sand and FIGURE 6 illustrates the mode in which the sand is conveyed to the interior of the expandable member 23. As shown in FIGURE 6 the feed pipe 25 is provided with a valve 28 through which air flows to a pipe 30 and to the interior of pipe 22 and expandable member 23. The pipe 30 is capped at the top, the cap having an aperture leading to the atmosphere and normally closed by means of a valve 31. As shown in FIGURE 6 the expandable member is fixed to pipe 22 by a clamping ring 29.

By admitting sand with the inflowing air and permitting air to escape through the valve 31 at a rate to maintain the desired pressure, sand is deposited within the expandable member 23 until the entire member is filled after which the feed pipe 25 can be removed. If desired, pipe 30 and valve 31 may also be removed together with the pipe 22 by simply tearing the expandable member and leaving the major portion thereof in the ground or the pipe 30 may be left in the ground.

FIGURE 5 illustrates the installation of pipe 22 and membrane or expandable member 23 when the membrane extends close to the surface of the ground and might result in lifting the surface of the soil and causing a "blowout." In this case, as indicated by the reference numeral 32, soil or sand is piled about the pipe at the ground surface to load the soil and prevent such "blowout." The expansion of the expandable member is brought about in the same way as has been described in connection with FIGURES 1 through 7, thus resulting, as in the case depicted in those figures, in expanding the walls of the spaced holes causing water to flow into the sand drains and thus stabilizing and strengthening the soil. The time required for such stabilization, of course, varies with the initial soil condition but is materially less than would be required to effect the same result by the surcharge or over-burden method mentioned hereinabove. In fact, the time required is reduced by a factor which may appreciably exceed 100%.

Referring now to FIGURES 7 to 11, there is shown therein a preferred method of soil strengthening wherein the pressure at various levels is adjusted. Holes 21, which are similar to the holes already discussed, have installed therein a pipe 33 (FIGURE 7) similar to the pipe 22, but differing therefrom in that it is provided with perforated sections 34, 35 and 36 alternating with unperforated portions 37, 38, 39 and 40.

Each perforated pipe section has an expandable member surrounding that section and fixed to the pipe at the unperforated portions above and below that section. Thus the expandable member 41 is fixed to the pipe sections 37 and 38, the member 42 is fixed to the pipe sections 38 and 39, the expandable member 43 is fixed to the pipe sections 39 and 40 and the lowest expandable member 44 is fixed to the pipe section 40.

As is shown in FIGURE 7 and in greater detail in FIGURE 12, the pipe 33 has within it a pair of pipes 46 and 47. A disc 48 is provided with apertures through which pipes 46 and 47 extend, the disc being fixed to the pipes and the periphery of the disc bearing against the inner walls of the pipe 33 and forming a "piston ring." Pipe 33 is capped at its upper end, pipes 46 and 47 passing therethrough and pipe 47 is provided with a valve member 50 at its upper end which, when opened, connects the interior of pipe 33 to atmosphere.

As seen in FIGURES 7 and 8 the pipes 46 and 47 are first lowered so that the piston 48 bears against the walls of the lowermost unperforated pipe section 40. Thus when the feed pipe 25 is positioned on and connected to the upper end of pipe 46 and valve 50 is closed, gradually increasing pressure applied through the feed line 25 is effective to expand and lowermost expandable member 44 thus expanding the lower portion of the walls of the hole 21 and exerting a gradually increasing pressure thereon which, in conjunction with like pressures exerted by the others of the expandable members installed in the adjacent holes, causes compression of the soil and the flow of water outwardly into the sand 24. As before, the direction of the arrows 26 and 27 indicates the application of pressure and the flow of water respectively.

In a typical example the maximum pressure utilized to expand the expandable members 44 would be approximately 60 pounds per square inch, the various holes being spaced apart on centers in the range of 10 to 50 feet as above indicated, both the pressure and spacing depending on the initial soil strength and increase in strength and stability desired.

As before, when the inflatable member 44 has been gradually inflated and the increasing pressures exerted for a sufficient time period to strengthen the soil at the lowermost level it is filled with sand utilizing in this instance the mechanism shown in FIGURE 12 which is essentially similar to that described in detail in connection with FIGURE 6. After the lowermost inflatable members have been thus filled with sand the pipes 46 and 47 together with the piston ring 48 are moved upwardly until ring 48 engages the next higher annular unperforated portion of the pipe designated 39. At this time sand is no longer fed with the air and the next higher expandable member 43 is expanded, the condition then being that depicted in FIGURE 9. After the expansion has occurred sand is again admitted (the value 50 being then again open) and the second lowest expandable member 43 is thus filled with sand. As before, the arrows 26 and 27 of FIGURE 9 indicate respectively the pressure applied upon the soil by the expanded and sand filled members and the arrows 27 indicate the flow of water into the sand 24 and upwardly to the soil surface.

Referring now to FIGURE 10, this figure illustrates the condition when the third uppermost expandable member 42 has been expanded and filled with sand and the uppermost member 41 has been expanded by air pressure, it being understood that as indicated in FIGURE 10, the unit comprising pipes 46, 47 and piston ring 48 is moved upwardly from annular unperforated sections 39 to section 38 and thence to the unperforated portion 40 of the next hole.

The condition depicted in FIGURE 11 is that when all expandable members have been filled with sand and the feed pipe 25 together with pipes 46 and 47 have been removed.

It is to be noted that when the uppermost expandable member is close to the surface of the ground the necessity arises for placing some surcharge on the soil around the pipe 32 to prevent blowout in the same manner as the fill 32 is placed about the pipe 22 of FIGURE 5. It should also be noted at this point that typical air pressures utilized at the various levels would be 60 pounds per square inch for expanding the lowermost expandable member, 45 pounds for the next highest member, 30 pounds for the third highest and 15 pounds for the uppermost, the foregoing being gage pressures rather than absolute pressures.

When the arrangement described above in connection with FIGURES 7–12 is utilized the pressure is of course maintained and increased on the respective ones of the expandable members at the particular level for a sufficient time to permit soil stabilization at that level before filling the expandable members with sand, readjusting the pipes 46 and 47 to a higher level and pressurizing the expandable members at that level.

Many variations and modifications of the methods described above may be made. For example, it may at times be desirable to release or reduce the pressure on the expanded member after the holes 21 have been partially enlarged and to add sand filling, thereafter repressuring the expandable members to provide a greater cross-sectional area of sand and a more effective drain.

Also while pneumatic pressure means have been referred to, other fluids may be used; the expandable members may be filled with concrete rather than sand; and the holes may be of any desired shape as may the expandable members.

We wish therefore to be limited not by the foregoing description but solely by the claims granted to us.

What is claimed is:

1. The method of strengthening the soil underlying an area on which a structure is to be built which comprises forming a plurality of spaced holes about the area, installing expandable members in all said holes generally concentric therewith, said members extending substantially to the bottom of said holes, filling the space between each said expandable member and the wall of the respective hole with drainage material and applying gradually increasing pressure on said members to expand them simultaneously and enlarge said holes to compress the soil and force water therefrom into said drainage material.

2. The method of strengthening soil as claimed in claim 1 wherein said expandable members are stretchable membranes.

3. The method as claimed in claim 1 wherein said drainage material is sand.

4. The method as claimed in claim 1 wherein said expandable members are expanded by applying fluid pressure to the interior thereof.

5. The method as claimed in claim 3 wherein said pressure is maintained until said soil has been strengthened to the desired degree and wherein said expandable members are thereafter filled with a solid material while maintaining said pressure, and said pressure is thereafter released.

6. The method of claim 5 wherein said solid material is sand.

7. The method of claim 5 wherein said solid material is concrete.

8. The method of strengthening and stabilizing soil to support a structure which comprises forming a plurality of spaced apart holes extending into the soil in the area to be strengthened, installing a plurality of expandable members in each said hole, said members being located at different corresponding levels, said members having less cross-sectional area when unexpanded than the cross-sectional area of the corresponding hole, filling the annular space between said expandable members and the hole walls with drainage material, substantially simultaneously applying fluid pressure to the interior of said expandable members located at the greatest depth in their respective holes, gradually increasing and maintaining said pressure until the soil at that depth has been strengthened to the desired degree, filling said expanded members with solid matter and repeating the steps of applying pressure to strengthen the soil and filling the expandable members with solid material successively at lesser and corresponding depths in the plurality of holes until all the expandable members have been expanded and filled with solid material.

9. The method of soil strengthening as claimed in claim 8 wherein said expandable members are stretchable membranes.

10. The method of strengthening and stabilizing soil as claimed in claim 8 wherein said drainage material is sand and wherein said solid material is also sand.

11. The method of strengthening and stabilizing soil as claimed in claim 8 wherein said drainage material is sand and said solid material is concrete.

12. Means for strengthening soil in a defined area, comprising a plurality of pipes inserted to a predetermined level in holes spaced about said area; at least one expandable member fixed to each said pipe, sand fill about each said expandable member; means comprising a supply pipe for each hole, said supply pipe extending into said first-mentioned pipe; means closing the annular space between each said pipe and said corresponding supply pipe and means controllably providing communication between said annular space and atmosphere.

13. Means for strengthening soil as claimed in claim 12 wherein each said pipe comprises a plurality of perforated sections alternating with a plurality of unperforated sections, said expandable members being affixed to said unperforated sections and surrounding said perforated sections.

14. Means for strengthening soil as claimed in claim 13 wherein a piston ring is slidable in said pipe, said piston ring having apertures therein, and wherein said pressure fluid supply pipe is fixed in one of said apertures, and said means providing communication between said annular space and atmosphere comprises, a pressure fluid release pipe fixed in the second said aperture whereby said piston ring may be positioned within an unperforated section of said pipe to provide communication between said fluid pressure supply and release pipes and the perforated section immediately below said unperforated section.

References Cited
UNITED STATES PATENTS

| | | | |
|---|---|---|---|
| 961,492 | 6/1910 | Goldsborough | 61—53.6 |
| 1,598,300 | 8/1926 | Moran | 61—35 |
| 3,164,964 | 1/1965 | Josephson | 61—35 X |

FOREIGN PATENTS

| | | |
|---|---|---|
| 703,654 | 2/1954 | Great Britain. |

JACOB SHAPIRO, *Primary Examiner.*